Oct. 26, 1926.
H. N. SPICER
1,604,427
MANUFACTURE OF ALUMINUM SULPHATE
Filed May 3, 1923
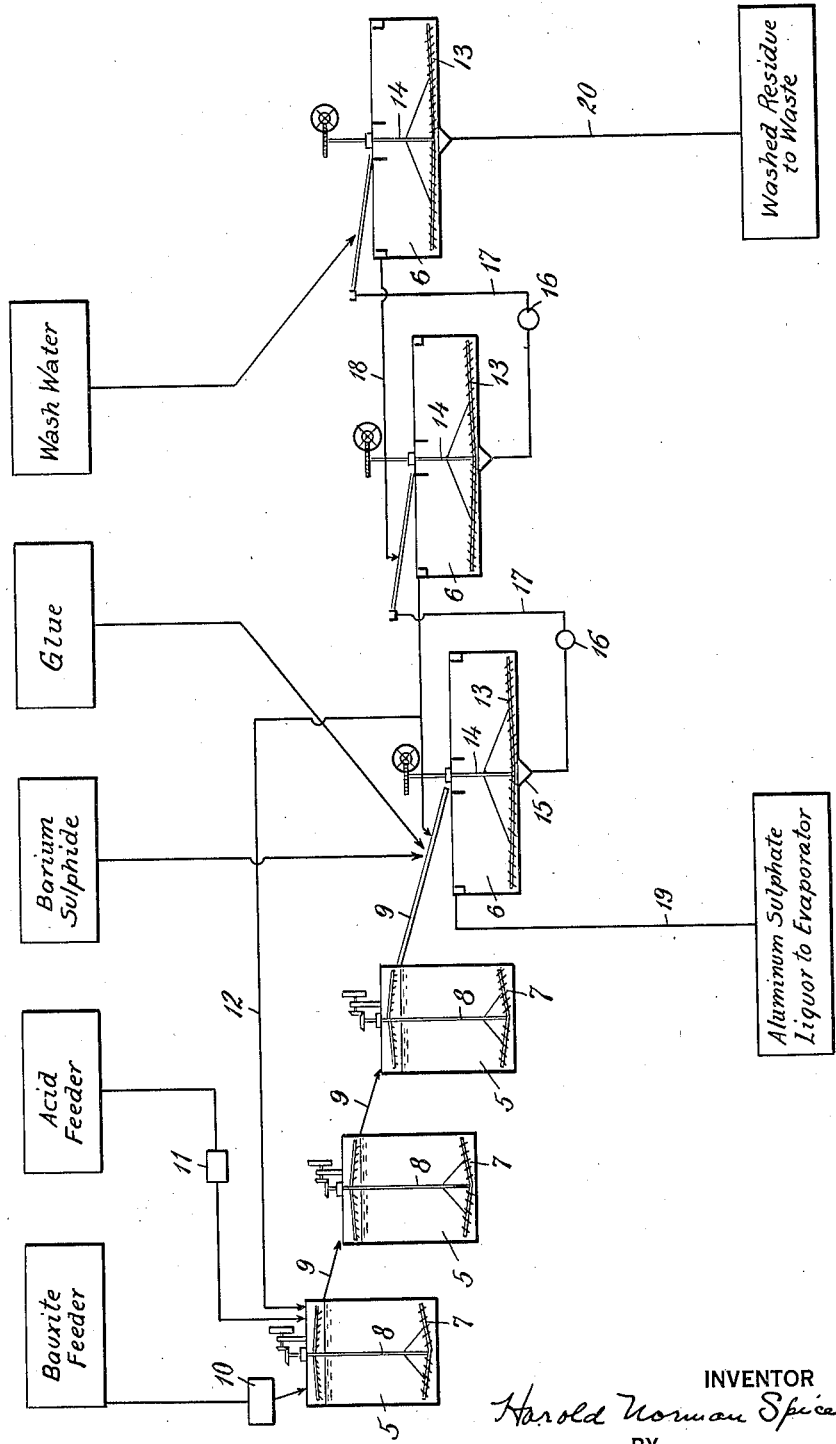
INVENTOR
Harold Norman Spicer
BY
Pennie Davis Marvin & Edmonds
his ATTORNEYS Patented Oct. 26, 1926.

1,604,427

UNITED STATES PATENT OFFICE.

HAROLD NORMAN SPICER, OF NEW YORK, N. Y., ASSIGNOR TO THE DORR COMPANY, OF NEW YORK, N. Y., A CORPORATION OF DELAWARE.

MANUFACTURE OF ALUMINUM SULPHATE.

Application filed May 3, 1923. Serial No. 636,434.

This invention relates to the treatment of materials with liquid reagents, and particularly to a method whereby the material and reagent are supplied in proper proportion continuously and the products are likewise withdrawn. The invention is applicable to the production of aluminum sulphate from bauxite as hereinafter described. It may be used also with advantage in the treatment of other materials, for example, in the manufacture of phosphoric acid from phosphate rock. The specific details of the method will vary depending upon the character of the material treated and the following description is therefore illustrative merely.

Aluminum sulphate and like products have been prepared heretofore by batch or non-continuous methods. According to such a method, finely ground bauxite (from 65 to 200 mesh) is mixed in a lead-lined tank with the proper proportion of 50° Bé. sulphuric acid and agitated for approximately four hours with air or live steam. The batch is then withdrawn and stored in large settling tanks from which the 30° Bé. aluminum sulphate liquor is eventually decanted. This liquor is evaporated and the aluminum sulphate is crystallized therefrom. The sludge is washed several times and the wash water is returned and used in making up the acid solution.

In carrying out my invention, the bauxite and sulphuric acid are combined continuously in predetermined proportion, and the mixture is successively subjected to agitation as it flows through a series of tanks. From these tanks the liquor overflows, carrying with it the finer particles of bauxite, the coarser particles remaining for a longer period and until disintegration by the acid has reduced their size so that they pass with the overflowing liquid from the tanks. A sufficient number of tanks is employed to ensure thorough disintegration of the bauxite. From the last tank or digester the mixture flows into the first of a series of washing tanks or thickeners from which the aluminum sulphate liquor overflows. In these thickeners the solids are subjected to a successive washing, the fresh wash water being added to the last thickener and the settled solids being advanced through the thickeners in countercurrent relation to the travel of the wash water. In the first thickener a solution of barium sulphide is added for the purpose of reducing any ferric salts present in the solution, and likewise a suitable coagulant such as glue may be added to assist in the primary separation of the solids from the liquor. A portion of the wash water may be returned and mixed with the acid in preparing the acid solution.

The batch method has several disadvantages. It requires a large installation of settling tanks with appurtenant pumps and pipe lines. In a typical installation thirty settling tanks with a settling area of 245 square feet per ton of bauxite treated are required. To operate such a plant, the attention of from five to fifteen men during twenty-four hours is necessary. A large amount of fuel is required to evaporate the weak aluminum sulphate liquor. The recovery calculated as aluminum oxide rarely exceeds 80 to 95%.

In contrast with the batch method, the continuous method described herein reduces the liquor settling space to a minimum inasmuch as three settling tanks having an area of 89.3 square feet per ton of bauxite replace the thirty tanks in the typical plant mentioned. The number of pumps and the pipe lines are correspondingly reduced, and consequently the initial cost and upkeep of the plant are minimized. Four men can successfully operate the plant on a twenty-four hour basis. A stronger liquor is produced and less evaporation is required, thereby effecting a saving in heat. A continuous recovery of 98½ to 99% can be maintained.

These results are possible because of the application of principles of operation which have not been applied heretofore in the production of aluminum sulphate and like materials. The settling of solids from liquids is divided into two periods, the free settling period and the compression period. During the first or free settling period, the pulp is diluted so that the solid particles are not in contact with each other. They settle, therefore, at their normal velocity. As the particles settle, the suspension at the bottom becomes more and more dense until the particles interfere with each other. At this point the "compression zone" begins. In this zone the particles rest upon each other and the sludge is compressed. At the bottom of the compression zone, the sludge reaches "final density" at which no change will occur in the moisture content of the sludge by continued detention thereof. Free settling is a function of area and not of time, and compression settling is a function of time and not of area. Consequently to secure effective separation of solids from liquids, it is necessary to provide sufficient area for free settling and also to provide for retention of the solids during the compression period.

The batch methods heretofore in use do not permit the application of these principles of separation. In batch methods heretofore in use, it has been customary to allow the pulp to stand in the settling tanks until in the judgment of the operator the final density is attained. The liquid is then siphoned off, avoiding any removal of sludge. The liquid which separated during the free settling period is thus necessarily held throughout the time required for final settling, and sufficient tankage to retain this liquid must be provided. Furthermore, all of the liquor which should theoretically separate cannot be withdrawn by siphoning, and the efficiency of the washing operation is materially reduced because of the liquor remaining with the sludge. My method permits the retention of the solids during the compression period, but the liquor is continuously withdrawn, advantage being taken of the rapidity with which free settling occurs. It is because of this practice that I am enabled to materially reduce the number of tanks employed in the operation.

Moreover, I have discovered that to obtain the most effective separation, the temperature of the pulp should be carefully regulated. During the first separation the temperature of the pulp preferably should not be less than 85° C. In the batch method the maintenance of such a temperature is impracticable. The large bodies of liquid cool rapidly and the liquor stands from two to six times as long as in the practice of my method. Any attempt to heat the settling tank directly results in the creation of eddy currents which disturb settling. In my method heat may be applied in the digesters and to the fresh wash water. The liquid remains in the thickeners during a relatively short time and heated wash water and pulp are constantly supplied. Consequently the temperature of the mixture in the thickeners may be regulated easily.

My invention has a further advantage in that the final discharge of the solids occurs at one point and under conditions which permit automatic regulation of the withdrawal of solids, depending upon the rate of settling. Thus if the solids settle more slowly, a smaller proportion of solids is withdrawn and a longer time for settling is permitted. Also in my method, coarser material may be treated than has been customary heretofore. The larger particles settle more rapidly than the smaller, and hence remain longer in the digesters. This ensures thorough treatment of the material before it escapes from the digesters.

In order that the method may be clearly understood, it will be described with reference to the accompanying drawing which illustrates diagrammatically an arrangement of an apparatus adapted to carry out the invention.

The apparatus comprises a plurality of digesters 5 and a plurality of thickeners 6, the digesters and thickeners being arranged respectively so that liquids will flow successively therethrough. The digesters and thickeners may be constructed of any suitable acid-resisting material. The digesters are provided with agitating arms 7 which are preferably adjustable on shafts 8, the latter being driven from any suitable source of power. The digesters are connected by launders 9 which permit the liquid carrying finely divided suspended material to overflow from each digester during the operation.

The bauxite or other material to be treated is fed continuously to the first digester by an automatic weighing device 10 which regulates the feed to the exact proportion desired. The sulphuric acid solution is likewise fed in predetermined proportion, for example, by a constant displacement pump 11. A portion of the wash water from the thickeners is returned through a pipe 12 and mixed with the acid to dilute the same, thus ensuring retention of aluminum sulphate washed from the sludge in the final product.

The thickeners 6 are provided with scraper arms 13 which are carried by shafts 14 and actuated from any suitable source of power. These scraper arms move the sludge that settles on the bottoms of the thickeners toward outlets 15 through which the sludge escapes. The sludge is forced by pumps 16 through pipes 17 into the succeeding thickeners and mixes therein with the wash water which is delivered to the last thickener and overflows to the preceding thickeners through launders 18. The aluminum sulphate liquor overflows from the first thickener through a launder 19 and the thoroughly washed sludge is withdrawn from the last thickener through a pipe 20.

In the operation the proper proportion of bauxite and acid continuously enter the first digester. Here the mixture is agitated and is preferably caused to circulate by the provision of an air lift or other suitable means which supplements the action of the stirring arms. The acid carrying the finer particles of bauxite overflows continuously into the second digester where the operation is repeated, and as dissolution of the coarser particles occurs this material likewise escapes from the first digester and passes successively through the other digesters with the mixture until the treatment is completed. Three digesters, as shown in the drawing, are usually sufficient for the accomplishment of the purpose, but digesters may be added or omitted as may be necessary, depending upon the character of the material treated and the activity of the solvent.

The mixture of acid and solid material passing from the last digester is mixed in the first thickener or in the preceding digester with wash water from the next succeeding thickener. At this point barium sulphide solution may be added to ensure reduction of ferric salts and a coagulant such as glue may be introduced to assist in the settling of the solids. The aluminum sulphate liquor overflows continuously from the first thickener and is sent to the evaporators for evaporation and crystallization of aluminum sulphate therefrom. In the first thickener the period of free settling is relatively short, but full advantage is taken of the free settling to continuously withdraw the aluminum sulphate liquor. The solids remain in the thickener until final settling has been accomplished and are withdrawn from the bottom of the thickener, the scrapers assisting in the movement of the thickened sludge to the outlet. This sludge, which necessarily carries a considerable portion of liquor which cannot be removed by settling alone, is delivered by the pump to the second thickener and is there mixed with wash water. The free settling period in the second thickener is likewise short and the wash water constantly overflows therefrom while the solids remain in the thickener until final settling has been accomplished. The settled sludge is withdrawn through the bottom of the thickener and pumped into the third thickener where fresh wash water is added and the operation is repeated, the wash water escaping through the preceding thickener while the washed residue after final settling is withdrawn from the bottom of the thickener. Three thickeners are shown to be sufficient in practice to accomplish the desired result, but the number may be increased or diminished as may be necessary to accomplish the purpose of the invention.

I claim:—

1. The method of treating solid materials with liquid reagents, which comprises digesting the solid material with the liquid reagent, retaining the solid material in the flowing stream until substantially complete digestion is accomplished and separating the digested solid material from the liquor produced by settling at a substantially uniform temperature, the temperature being maintained by addition of heat to the mass outside the settling zone.

2. The method of treating solid materials with liquid reagents, which comprises digesting the solid material with the liquid reagent in a flowing stream, adding the solid material and liquid reagent in predetermined proportions to the flowing stream, retaining the solid material in the flowing stream until substantially complete digestion is accomplished and separating the digested solid material from the liquor produced by settling at a substantially uniform temperature, the temperature being maintained by heating the mass before it enters the settling zone.

3. The method of treating solid materials with liquid reagents, which comprises digesting the solid material by continuous agitation while it travels co-current with the liquid reagent in a flowing stream, adding the solid material and liquid reagent in predetermined proportions to the flowing stream, retaining the solid material in the flowing stream until substantially complete digestion is accomplished, separating the digested solid material from the liquor produced by settling, and washing the residue of solid material under like conditions with water traveling countercurrent thereto.

4. The method of treating solid materials with liquid reagents, which comprises digesting the solid material with the liquid reagent in a flowing stream, adding the solid material and liquid reagent in predetermined proportions to the flowing stream, retaining the solid material in the flowing stream until substantially complete digestion is accomplished, separating the digested solid material from the liquor produced by settling, and washing the residue of solid material under like conditions with water traveling countercurrent thereto, the temperature being maintained by heating the mass and the wash water before the settling zone is reached.

5. The method of treating solid materials containing relatively coarse particles with liquid reagents, which comprises agitating and digesting the solid material by continuous agitation while it travels co-current with the liquid reagent, withdrawing the liquor produced with only so much of the disintegrated solid material as will remain in suspension therein, and separating the suspended solid material from the liquor by settling.

6. The method of treating solid materials containing relatively coarse particles with liquid reagents, which comprises agitating and digesting the solid material with the liquid reagent, withdrawing the liquor produced with only so much of the disintegrated solid material as will remain in suspension therein, and separating the suspended solid material from the liquor by settling at a substantially uniform temperature.

7. The method of treating solid materials containing relatively coarse particles with liquid reagents, which comprises agitating and digesting the solid material by continuous agitation while it travels co-current with the liquid reagent, withdrawing the liquor produced with only so much of the disintegrated solid material as will remain in suspension therein, separating the suspended solid material from the liquor by settling and continuously withdrawing a constant volume of the settled solids.

8. The method of treating solid materials containing relatively coarse particles with liquid reagents, which comprises agitating and digesting the solid material by continuous agitation while it travels co-current with the liquid reagent, withdrawing the liquor produced with only so much of the disintegrated solid material as will remain in suspension therein, separating the suspended solid material from the liquor by settling, and washing the residue of solid material under like conditions with water traveling countercurrent thereto.

9. The method of treating solid materials with liquid reagents, which comprises digesting comminuted solid material by continuous agitation while it travels co-current with a liquid reagent adapted to reduce materially the size of particles of such solid material, and withdrawing the reagent with only such solid particles as are below a predetermined size.

10. The method of treating solid materials with liquid reagents in a series of steps, which comprises continuous feed to the beginning of the series of comminuted solid material and a liquid reagent adapted to reduce materially the size of particles of such material, and continuously discharging from each step to the next a mixture of the reagent and reduced solid particles below a predetermined size.

11. The method of treating solid materials with liquid reagents, which comprises treatment of such materials and reagents in a series of circulation agitators in which the larger and smaller solids are circulated in different zones and discharging a portion of the mixture from the zone containing smaller particles into the next agitator of the series.

In testimony whereof I affix my signature.

HAROLD NORMAN SPICER.